United States Patent [19]

Picton

[11] Patent Number: 4,726,612
[45] Date of Patent: Feb. 23, 1988

[54] PIPE CONNECTING DEVICE

[76] Inventor: David J. Picton, 17 Leaver Place, Manurewa, New Zealand

[21] Appl. No.: 905,308

[22] Filed: Sep. 9, 1986

Related U.S. Application Data

[63] Continuation of Ser. No. 429,685, Sep. 30, 1982, abandoned.

[51] Int. Cl.⁴ .............................................. F16L 33/20
[52] U.S. Cl. .................................. 285/256; 285/179; 285/156; 285/259; 285/397
[58] Field of Search .................. 285/256, 382, 382.1, 285/259, 238, 39

[56] References Cited

U.S. PATENT DOCUMENTS

| | | | |
|---|---|---|---|
| 2,535,460 | 12/1950 | Rotter et al. | 285/256 X |
| 3,118,692 | 1/1964 | Fitzhugh | 285/238 |
| 4,310,184 | 1/1982 | Campbell | 285/238 |
| 4,313,628 | 2/1982 | Duenke | 285/259 X |

FOREIGN PATENT DOCUMENTS

| | | | |
|---|---|---|---|
| 115489 | 7/1942 | Australia | 285/256 |
| 1806955 | 8/1971 | Fed. Rep. of Germany | 285/256 |
| 2305466 | 8/1974 | Fed. Rep. of Germany | 285/256 |
| 2423347 | 12/1974 | Fed. Rep. of Germany | 285/256 |
| 1249979 | 11/1960 | France | 285/256 |
| 1451588 | 10/1976 | United Kingdom | 285/256 |

Primary Examiner—Thomas F. Callaghan
Attorney, Agent, or Firm—Wegner & Bretschneider

[57] ABSTRACT

A method and pipe connecting piece for connecting a pipe to a fluid port, such as another pipe. The pipe connecting piece has an end portion for insertion into the bore of a pipe-end, an intermediate portion of larger diameter than the end portion, an attachment means for attaching the connecting piece to a fluid port, and a sleeve.

2 Claims, 11 Drawing Figures

PIPE CONNECTING DEVICE

This application is a continuation of Ser. No. 429,685, filed Sept. 30, 1982, and now abandoned.

BACKGROUND OF THE INVENTION

This invention relates to a method for connecting pipes, hoses, tubes or the like to a fluid port, such as a tap or another pipe, and a pipe connecting piece. The method will generally be most useful for joining plastics pipes, however it can be utilised to join metal pipes as well.

In the past, various devices have been used for connecting pipes end to end. However, such devices have tended to be bulky and expensive because of the need to ensure that once the fitting is connected to the pipes, there will be no leak of fluid from within the pipes through the joint.

A common device for joining pipes utilises a metal fitting with a threaded central portion and an end portion of such a diameter that when it is inserted into the end of a pipe it causes the pipe end to expand. A metal collar is then screwed to the central portion to clamp the pipe against the end portion. These devices are cumbersome.

Alternative means for clamping the pipe to the end portion are also utilised. A metal sleeve may be placed over the pipe above the inserted end portion and crimped or swaged in place. This results in a joint that is prone to leakage due to the 'creep' of standard pipes and may have a weak point at the connection between the end portion and the central portion of the fitting. Crimping the sleeve generally results in the formation of an 'ear' or loop of material from the sleeve which reduces the remainder of the sleeve in size. This weakens the sleeve, and deforms the pipe, often creating a minute channel between the pipe and the end portion that allows leakage of fluid carried by the pipe, particularly when it is a gas. If the sleeve is to be crimped again it is necessary to position the crimping device at exactly the same position as previously. Crimping may also deform and damage the end portion of the fitting.

SUMMARY OF THE INVENTION

It is an object of the present invention to provide a simple and effective method for securing pipes or tubes to a fluid port so that they will not readily leak. It provides a pipe connecting piece that can be made from plastics, as well as metal.

Accordingly, in a first aspect, the present invention broadly consists in a pipe connecting piece comprising a hollow body open at two ends, a first open end portion of the body being tubular of a first outside diameter for snug insertion, in use, into the bore of a pipe, an intermediate portion adjacent the first end portion being of a second outside diameter greater than said first outside diameter, and a second open end portion comprising a port attachment means for attaching the pipe connecting piece to a fluid port, and a sleeve having an internal diameter greater than the external diameter of the pipe to be connected.

In a second aspect, the present invention broadly consists in a method for securing a pipe to a fluid port, the method comprising the steps of inserting a first open end portion of a hollow body into the end of the pipe to be joined, said hollow body being open at two ends and having an intermediate portion adjacent the first end position of an outside diameter greater than the outside diameter of the first end portion and having a second open end portion comprising a port attachment means for attaching the hollow body to a fluid port, placing a sleeve across the end of the pipe, attaching the sleeve to the pipe using a compacting device, said sleeve also being attached to the said intermediate portion, and attaching said port attachment means to a fluid port, said compacting device comprising a pair of jaws operable so as to move to a substantially closed position with substantially linear relative motion.

BRIEF DESCRIPTION OF THE SEVERAL VIEWS OF THE DRAWINGS

The above gives a broad description of the present invention, a preferred form of which will now be described by way of example, with reference to the accompanying drawings in which.

DETAILED DESCRIPTION

Figure 1:
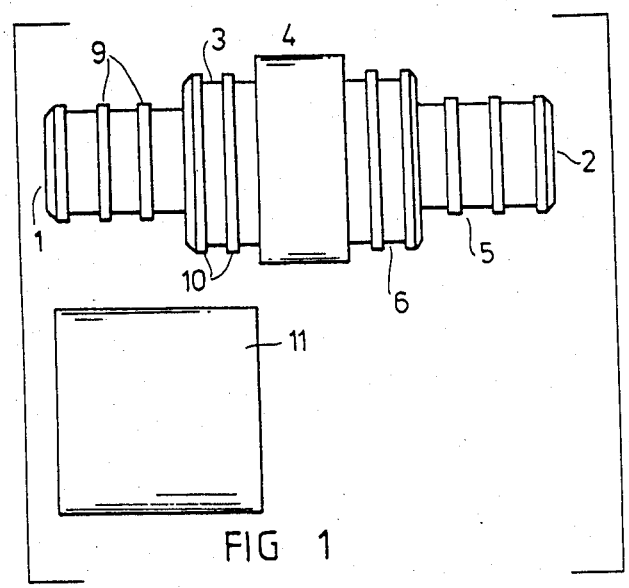
FIG. 1 shows a side view of a pipe connecting piece in accordance with the present invention.
Figure 2:
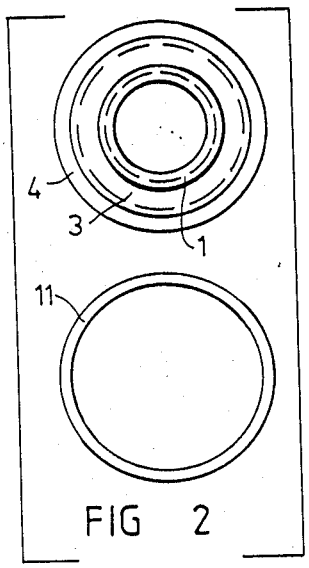
FIG. 2 shows an end elevation of the pipe connecting piece shown in FIG. 1.
Figure 9:
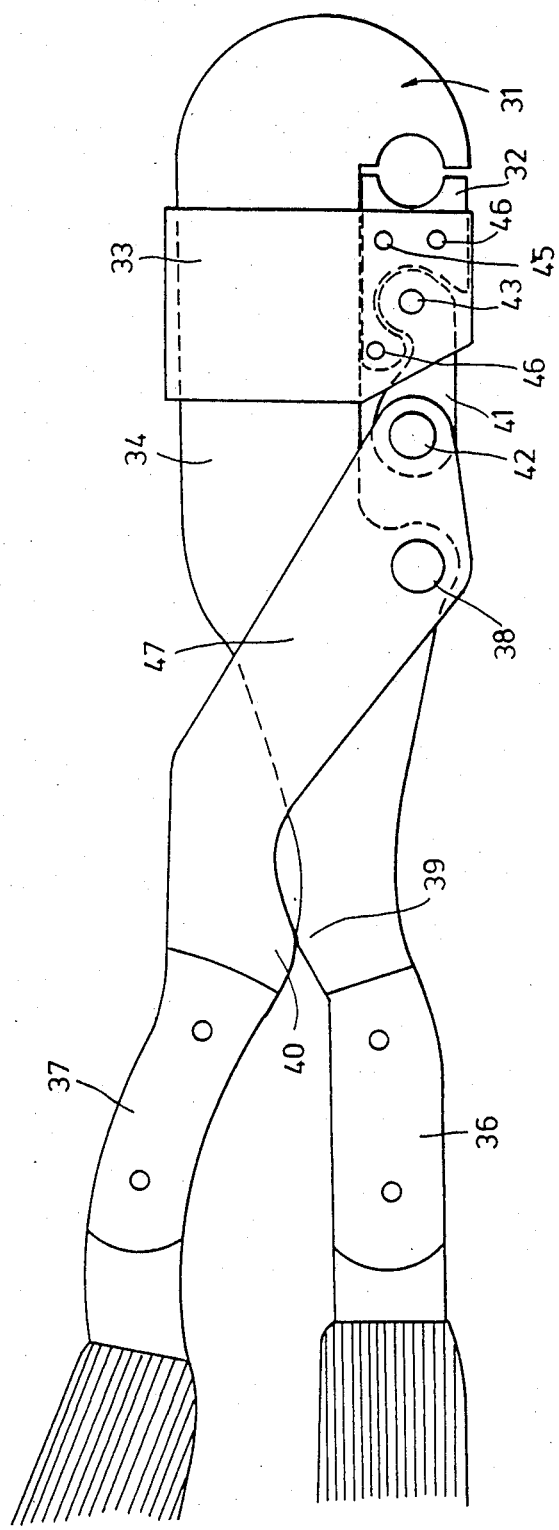
FIG. 9 shows a plan view of a compacting device for use with invention.

Basically, the present invention involves the use of a connecting piece such as the one illustrated in FIGS. 1 and 2 in conjunction with a crimping tool such as the one illustrated in FIG. 9.

The connecting piece is a hollow body open in at least two ends 1,2 and may be in the form of a tube, typically formed of nylon or other plastics material, with an end portion 1 in the form of a spigot over which the end of the pipe to be connected can be fitted. The connector shown in FIG. 1 has a stepped outside diameter, so that at each end of the tube the outside diameter is such that it will just fit within the pipe to be connected. End portion 1 may be tapered on the outside to permit easy insertion into the bore of the pipe, and may also be tapered on the inside to reduce turbulence in the flow of fluid through the connecting piece.

Adjacent the end portion 1 is an intermediate portion 3 of the hollow body. The intermediate portion is of a greater diameter than the end portion, typically being the same diameter as the outside diameter of the pipe to be connected, which will normally be a standard size. The intermediate portion 3 provides a shoulder against which the pipe to be connected abuts.

Preferably, although not necessarily, there is a third, central, portion 4 of greater diameter still than the said intermediate portion.

Adjacent the intermediate portion is an attachment means 5. The attachment means is for attaching the pipe connecting piece to a fluid port, such as a tap, or another pipe of the same or a different diameter.

The attachment means may be tubular of a third outside diameter, which may be substantially the same as the first outside diameter, for snug insertion into the bore of another pipe. FIG. 1 illustrates such an attachment means, which enables two pipes to be joined together. When a central portion 4 is incorporated into such a pipe connecting piece, a second intermediate means 6 may be provided to the attachment means.

Figure 4:
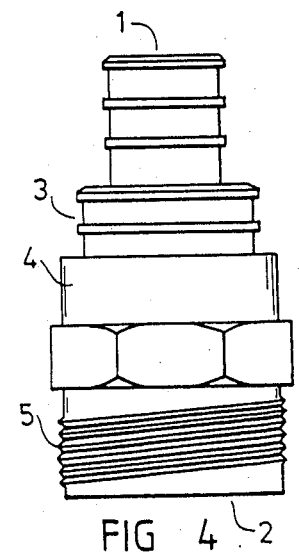

FIG. 4 shows an alternative attachment means 5, being a threaded spigot, which can be screwed on to a tap or other threaded fitting.

Figure 6:
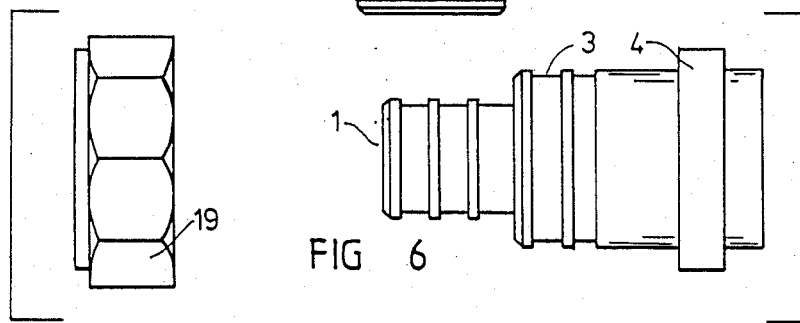

In FIG. 6, a nut 19 makes up the attachment means. The nut is passed over the end portion 1 and intermediate portion 3 of the pipe connecting piece, and abuts against the central portion 4, which has a diameter sufficiently small to enable the threaded end 7 of the nut to pass over it, but sufficiently large so that inwardly projecting flange 8 of the nut is caught by it.

The end portion 1 which fits within the pipe has a series of radial ribs or ridges 9. The ribs may be sloped away from the end of the piece, as already found on many ordinary close fitting connecting pieces for inserting into pipes, making the ends easier to insert into the pipe than to withdraw out of it; but sloped ribs are not necessary to the present invention, and the drawings show straight ribs. The intermediate portion 3 is also preferably ribbed 10, to provide better sealing once the sleeve described below is in place.

Figure 7:
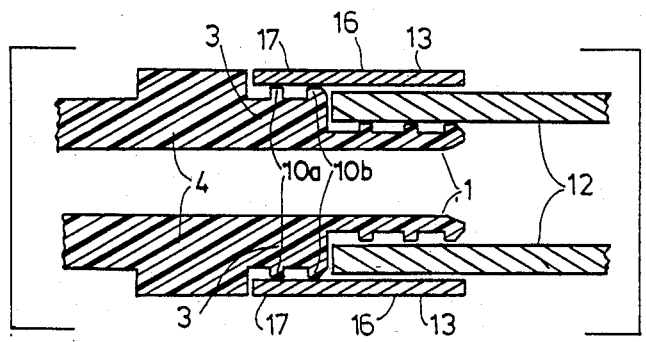
FIG. 7 shows an exploded cross-section view of a pipe connecting piece, pipe and sleeve when assembled to form a pipe joint.
Figure 8:
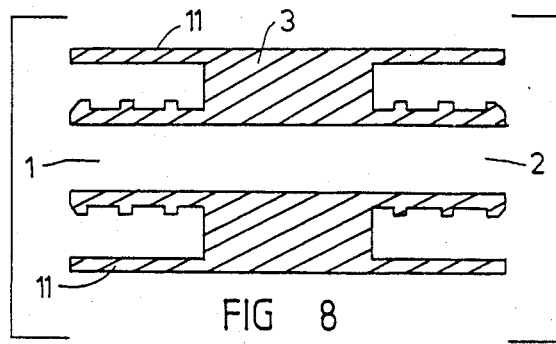
FIG. 8 shows a cross-section view of an alternative embodiment of a pipe connecting piece.

A sleeve 11, typically made of a metal such as aluminium or copper, is comprised of an open tube with an internal diameter greater than the external diameter of the pipe to be connected, so that the sleeve may slide over the pipe when the end portion of the pipe connecting piece is inserted into it. The sleeve may be integral with the hollow body, as shown in FIG. 8, or separate from the hollow body, as shown in FIG. 7. In the latter case, the sleeve is preferably attachable to the hollow body at the intermediate portion 3. The sleeve may be attached to the pipe connecting piece prior to use, or at the time that the connector is joined to a pipe.

The invention may be performed without a separate sleeve as such. When, for instance, the pipe to be connected is made of aluminium or copper, the pipe can be attached directly to the pipe connecting piece using the crimping tool described below.

I shall now describe the compacting device. The compacting device has two jaws.

One jaw may comprise a fixed jaw 31 and the other jaw 32 may, in use, be movable with respect to an article placed between the jaws, the movable jaw 32 being able to be moved in a substantially linear fashion relative to the jaw 31. The two jaws may, however, both be movable with respect to an article between them.

Preferably only linear motion is permitted, that is, the two jaws move together or apart along the same straight line. This linear motion is necessary only when both the jaws are in operable contact with the article to be compacted. At other times, such as when the jaws are open or opening, other movement may be permitted.

Jaw attachment means are provided to engage the jaws together and to restrict the movement to the linear movement above described and the jaw attachment means may comprise a looped or substantially U-shaped material such as for example a metal material so that the loop or alternatively the U-shaped part and the jaw 32 together encircle at least part of the jaw 31. Thus to this end a substantially U-shaped member 33 is passed about the back 34 of the fixed jaw 31. The member 33 being engaged with the movable jaw 32 for example by rivets such as rivets 44, 45, and 46.

In an alternative embodiment, the jaw attachment means may comprise a guide member attached to one said jaw, the guide member engaging the other jaw in a pin in groove arrangement. The guide member may be a plate or plates overlapping the other jaw. A pin or stud protruding from the plate is positioned in a groove provided in the other jaw to permit said substantially linear relative motion between the jaws.

Thus in FIG. 9 the jaw 32 may slide relative to the jaw 31.

Operating means are provided to move the jaws 31 and 32, and in one embodiment a pair of handles 36 and 37 are provided connected one to each jaw and to this end the handle 36 is connected to the jaw 31 and the handle 37 is connected to the jaw 32. Handle 37 may be divided into a fork so that portion 47 in FIG. 9 is duplicated on the other side of the tool. The cross-over of the jaws and handles has the effect that when the handles are moved inwardly, the jaws are moved together and vice versa. This is believed to be the most convenient mode of use. The handles 36 and 37 are pivotally connected one to the other for example through pivot 38.

The handles 36 and 37 are shaped so that they are position relatively close together when the jaws 31 and 32 are in the closed position and may be shaped to provide protrusions 39, and 40 to provide a limit to the movement together of the handles.

Between the jaw 32 and the handle 37 is provided a link 41, shown partly by dotted outline in FIG. 9, which is pivotally fixed to the handle 37 for example by a pivot pin 42 and pivotally affixed to the jaw attachment means 33 for example by a pivot pin 43. The arrangement of these pivot pins 38, 42 and 43 is preferably such that when the jaws are in the substantially closed position as shown in the figure the pivot pins lie substantially on a straight line. Link 41 may alternatively or additionally be pivotally affixed directly to jaw 32.

In FIG. 9 the handles are shown in a cross-over arrangement but it is also possible to form the handles in an arrangement where they do not cross over but is believed that the cross-over arrangement is preferable.

It is also envisaged that it would be possible to provide the compacting device with interchangeable jaws and also it is envisaged that the compacting device could be modified for example by providing a sharp edge within each jaw so as to be usable to crack or break seals or like rings so as to enable such rings or seals to be removed from a member which they encircle.

The jaws, when in the closed or substantially closed position, define an area that substantially corresponds to the shape of the outer surface of the article to be compacted. Typically the area will be circular, as shown in FIG. 9, so that the jaws may operate on sleeves or rings, and each jaw will have a semi-circular cut-out therein. However, if the area is a parallellogram, then triangular cut-outs may be provided. At least part of the outside edge of the area should have a smaller dimension than the corresponding part of the article to be compacted, otherwise the article could fit totally within the area. Preferably all of the outside edge of the area has such smaller dimension.

As the portion of the sleeve that is compacted is limited to the portion that comes into operable contact with the jaws the jaws should be sufficiently deep so as to ensure that a sufficient portion of the sleeve it compacted. Typically, the jaws could be 8 mm deep.

Figure 10:
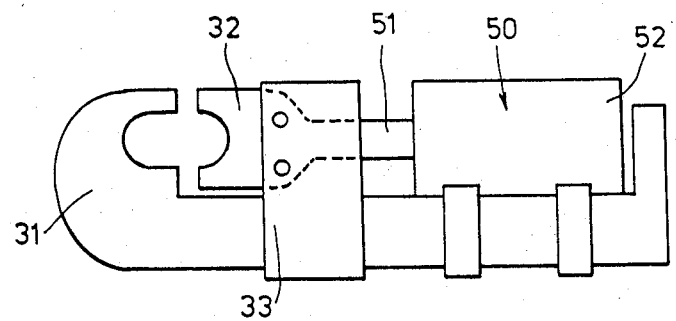
FIG. 10 shows a diagrammatic side elevation of an alternative compacting device and, FIG. 11 shows a diagrammatic side elevation of a further alternative compacting device.

In the embodiment of FIG. 10 the jaw 32 is moved by a piston and cylinder assembly 50 and preferably the piston 51 is connected to jaw 32 and the cylinder 52 is connected to jaw 31. The piston and cylinder assembly can be double acting, or return springs can be used.

Figure 11:
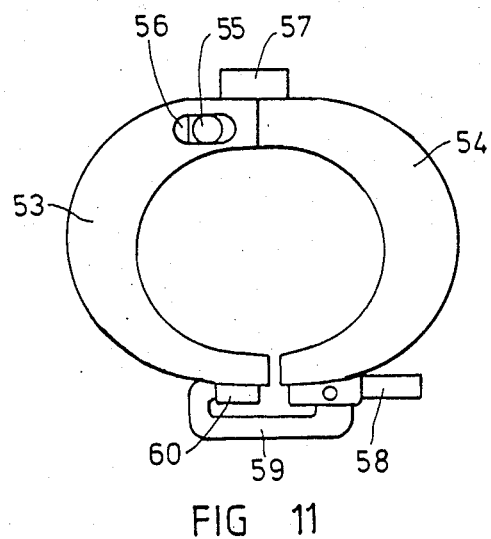

In FIG. 11 jaws 53 and 54 are provided. One jaw, such as jaw 54 has a join or other protuberance 55 which is positioned in a slot 56 in the other jaw, e.g. jaw 53. At the other end of jaws 53 and 54 is provided a catch such as pivotal catch 59 which is moved to catch behind protuberance 60 as shown in FIG. 11. Catch 59 may be operated by a piston and cylinder assembly.

One or more and preferably two preferably hydraulic piston and cylinder assemblies 57 and 58 are provided which when operated act to pull the jaws 53 and 54 together in a linear manner, assembly 57 acting between jaws 53 and 54 and assembly 58 acting between jaw 54 and catch 59 which acts on protuberance 60 and thereby moves jaw 53. Jaws 53 and 54 need not be solid as shown, and could comprise, for example multi-link chains.

The use of the invention is as follows:

As shown in FIG. 7, the pipe end to be joined 12 is placed over the end portion 1 of the pipe connecting piece. Then metal sleeve 13 is placed over the pipe end to extend along the portion of the pipe within which the end portion extends, and across the adjacent intermediate portion 3 of the connector as well. As already described, the sleeve may have already been attached to the connector or may have been integral with the connector. The central portion 4 acts as a divider between the metal sleeve and the attachment means and its diameter is typically the same as the outside diameter of the sleeves to ensure a smooth joint.

The sleeves are then attached to the end of the pipe, using the compacting device about point 16, and, if the sleeve is not already attached to the intermediate portion of the pipe connector, about point 17 between ribs 10a and 10b. It is not essential that the sleeve extends across the intermediate portion 3, however, when the sleeve is so attached to the pipe connecting piece, it much strengthens the joint and provides a further seal against leakage.

To operate the compacting device of FIG. 9 the handles are moved apart so that the jaws may move each side of the fitting and the arrangement is such that sufficient movement of the jaw 32 is made to allow the compacting device to be passed about the sleeve 13. The handles are then moved inwardly and the jaws will compact the sleeve onto the piping or connector. During such compacting it is found that the sleeve 13 has an increase in length and wall thickness and a corresponding diameter decrease which is substantially uniform about the circumference of the sleeve, and at or about the portions of the sleeve on which the compacting device operated. The remaining portion of the sleeve on which the compacting device did not operate is substantially unaffected. The constructions of FIGS. 10 and 11 are operated in a similar manner.

In particular the final linear movement of the jaw means that a substantially even pressure is provided about the sleeve in use and thus there is no tendency to squeeze one side of the sleeve more than the other. Also it is found that there is no tendency for excessive protuberances to be formed on the sleeve and thus no positions of substantial weakness are created. Furthermore, the sizing of the jaws can be chosen so that a substantially standard compacting pressure is provided for each operation.

Thus the semi-circular jaws shown in the drawing will cause a standard pressure to be applied when the handles are moved together. Therefore sleeves may be compacted so that in all cases a compacting pressure that is neither too great so as to damage the piping nor too soft which could allow leaks is achieved.

Also the in line arrangement of the pivots 38, 42 and 43 mean that, in use, initially a relatively fast closing movement of jaws is achieved whilst the last movement is relatively slow thus allowing good leverage to be achieved during the last stages of movement when greater pressure is required.

The narrow angle of the handles is also advantageous as it allows the tools to be used into corners and into other places which would otherwise be difficult to use the compacting device. The rigid handle connected to the fixed jaw also allows substantial stability of the tool in use.

The hydraulic arrangements are also advantageous as relatively large diameter operations can be performed. Also compacting of articles other than sleeves or ferrules can be achieved. As the pressure on the internal face of the article being compacted is determined by the jaw size and is substantially even over the inner surface, compacting can be effected with little risk of damage to any inner member.

Also thickening of the walls during compacting means that the sleeve used is in fact strengthened by the compacting operation.

The metal sleeve provides structural strength to the pipe connection, so that the wall thickness of the end portion of the pipe connector required to be fitted in the pipe end need not be very great. Thus, the present invention provides a minimum of interference of fluid flow through the pipe.

Figure 3:
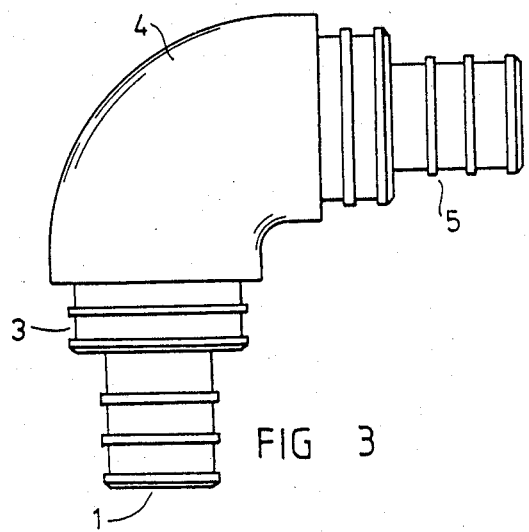
FIGS. 3 to 6 show additional pipe connecting pieces.
Figure 5:
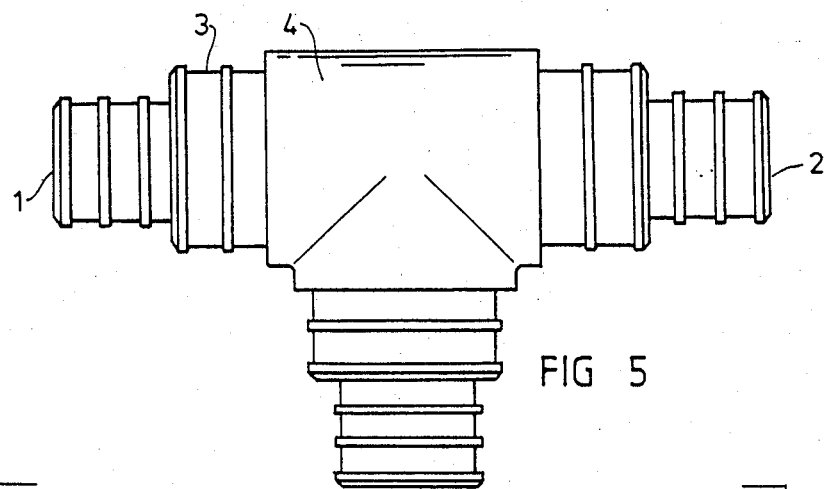

Various forms of the pipe connecting piece may be used. For example, the connecting piece may define angle-bends as illustrated in FIG. 3 or T-junctions as in FIG. 5 to provide joints of various configurations, and many different forms of attachment means may be utilised.

What is claimed is:

1. A pipe connector comprising an elongated plastic body having a bore therethrough, one end of the body having means enabling coupling of the bore at the end to a fluid port, the other end of the body comprising a first spigot portion coaxial with the bore and a second coaxial spigot portion separated from the first spigot portion by a step, each of the spigot portions being of substantially cylindrical form, each with a first protruding circumferential rib at the end of the respective spigot portion and a second protruding circumferential rib between the end of the respective spigot portion but spaced inwardly therefrom, the second spigot portion having a larger external diameter than the first spigot portion; and deformable metal sleeve normally having coaxial cylindrical inner and outer surfaces disposed on the second spigot portion, swaged over said ribs on the second spigot portion to strengthen the connector and to provide a seal against leakage, and projecting over the first spigot portion to define an annular cylindrical cavity between the sleeve and the first spigot portion, the inner surface of said metal sleeve being, in its unswaged portions, of larger diameter than the external diameter of the circumferential ribs on the second spigot portion, and said sleeve being adapted to be swaged to engage a hose positioned in the annular cylindrical cavity.

2. A pipe connector as claimed in claim 1 including a resilient hose inserted in said annular cylindrical cavity, the metal deformable sleeve being swaged around the hose over the ribs on the first spigot portion.

* * * * *